(12) United States Patent
Juzak et al.

(10) Patent No.: US 10,584,735 B2
(45) Date of Patent: Mar. 10, 2020

(54) PIPE CLIP WITH TIGHTENING SCREW HAVING TORQUE LIMITING CAP

(71) Applicant: J. van Walraven Holding B.V., Mijdrecht (NL)

(72) Inventors: Marek Juzak, Mijdrecht (NL); Frank Nijdam, Zeewolde (NL)

(73) Assignee: J. Van Walraven Holding B.V., Mijdrecht (NL)

(*) Notice: Subject to any disclaimer, the term of this patent is extended or adjusted under 35 U.S.C. 154(b) by 191 days.

(21) Appl. No.: 15/736,567

(22) PCT Filed: Jun. 30, 2016

(86) PCT No.: PCT/NL2016/050463
§ 371 (c)(1),
(2) Date: Dec. 14, 2017

(87) PCT Pub. No.: WO2017/003287
PCT Pub. Date: Jan. 5, 2017

(65) Prior Publication Data
US 2019/0055978 A1 Feb. 21, 2019

(30) Foreign Application Priority Data
Jul. 2, 2015 (NL) ..................................... 2015075

(51) Int. Cl.
*F16B 31/02* (2006.01)
*F16L 3/10* (2006.01)
*F16L 55/033* (2006.01)

(52) U.S. Cl.
CPC ............ *F16B 31/027* (2013.01); *F16B 31/02* (2013.01); *F16L 3/1033* (2013.01); *F16L 55/0336* (2013.01)

(58) Field of Classification Search
CPC .... F16B 31/027; F16L 3/1033; F16L 55/0336
See application file for complete search history.

(56) References Cited

U.S. PATENT DOCUMENTS

| 3,856,245 | A | * | 12/1974 | Byerly | ...................... | F16L 3/12 |
| | | | | | | 248/74.3 |
| 6,732,982 | B1 | * | 5/2004 | Messinger | ............ | F16L 3/1233 |
| | | | | | | 24/16 PB |

(Continued)

FOREIGN PATENT DOCUMENTS

| DE | 8806714 U1 | 8/1988 |
| DE | 4039260 A1 | 6/1992 |

(Continued)

*Primary Examiner* — Robert Sandy
(74) *Attorney, Agent, or Firm* — Hoffmann & Baron, LLP

(57) ABSTRACT

A pipe clip includes a metal annular clip body having at least two opposing radial flanges defining an opening adapted to arrange the pipe clip around a pipe. The clip body has at one of the radial flanges a female fastening. The pipe clip includes a tightening screw having a head and a shank. The shank is provided with a male thread adapted to cooperate with the female fastening. The head engages the other of the flanges so as to tighten the flanges towards each other and tighten the pipe clip around the pipe. The pipe clip has a vibration insulating lining provided on the inner side of the clip body. A torque limiting cap is arranged on the screw head of the tightening screw. The torque limiting cap includes at least one torque transferring feature that couples the cap to the screw head in a rotational direction.

19 Claims, 4 Drawing Sheets

(56) References Cited

U.S. PATENT DOCUMENTS

| | | | |
|---|---|---|---|
| 7,611,101 B2 * | 11/2009 | van Walraven | F16L 55/035 |
| | | | 248/58 |
| 9,488,201 B2 * | 11/2016 | Sumners | F16L 59/135 |
| 9,518,684 B2 * | 12/2016 | Juzak | F16B 35/06 |

FOREIGN PATENT DOCUMENTS

| | | |
|---|---|---|
| EP | 1000289 B1 | 10/2002 |
| FR | 2852067 A1 | 9/2004 |
| FR | 2928429 A1 | 1/2009 |

\* cited by examiner

PIPE CLIP WITH TIGHTENING SCREW HAVING TORQUE LIMITING CAP

CROSS-REFERENCE TO RELATED APPLICATIONS

This application is the National Stage of International Application No. PCT/NL2016/050463 filed Jun. 30, 2016, which claims the benefit of Netherlands Application No. NL 2015075, filed Jul. 2, 2015, the contents of which is incorporated by reference herein.

FIELD OF THE INVENTION

The invention relates to a pipe clip comprising a metal annular clip body having at least two opposing radial flanges defining an opening adapted to arrange the pipe clip body around a pipe, wherein the pipe clip body has at one of the radial flanges a female fastening means and wherein the pipe clip comprises a tightening screw having a screw head and a screw shank, said screw shank being provided with a male thread adapted to cooperate with the female fastening means, and wherein the screw head engages the other of the radial flanges so as to tighten the flanges towards each other and tighten the pipe clip around the pipe, and wherein the pipe clip has a vibration insulating lining provided on the inner side of the annular clip body.

BACKGROUND OF THE INVENTION

Such pipe clips are well known in the art, see for an example FIG. 1 of EP 1 000 289. During fitting of the pipe clip around a pipe, the radial flanges of the pipe clip are tightened towards each other by means of the tightening screw. If the pipe clip is tightened with a certain force the vibration insulating layer is compressed between the pipe clip body and the pipe surface. If this compression is excessive, the vibration insulating effect of the layer is reduced.

The invention has for an object to provide an improved pipe clip that removes or at least mitigates the problem of a reduced vibration insulating effect.

SUMMARY OF THE INVENTION

This object is achieved by a pipe clip of the type described at the outset, wherein a torque limiting cap is arranged on the screw head of the tightening screw, said torque limiting cap including at least one torque transferring feature that couples the cap to the screw head in a rotational direction.

During fitting of the pipe clip the torque limiting cap is engaged by a screw driver. The torque limiting cap transfers the torque applied by the screw driver to the screw head and warrants that the tightening screw cannot be tightened beyond a predetermined maximum torque. Hence, the flanges of the pipe clip cannot be tightened towards each other excessively. By selecting a suitable torque limit provided by the torque limiting cap a sufficient vibration insulating effect of the pipe clip can be assured.

By the selection of the specific structure and/or material of the torque limiting cap, it can be designed for a certain optimal vibration insulating function.

The torque limiting cap according to the invention may have different embodiments.

In a preferred embodiment the torque limiting cap is made of plastic and has on an inner side a protrusion that mates with a recess in the screw head such that a torque can be transferred from the cap to the screw head, and which plastic cap has on an outer side a recess which is able to mate with a screw driver, wherein the plastic cap is adapted and arranged to be destructed at the recess by the screw driver when the torque applied by a screw driver to the cap exceeds a predetermined value so as to limit the torque to be applied to the screw.

The choice of the specific plastic material used influences the maximum torque that the cap can transfer to the screw before the recess that mates with the screw driver is destructed. The selection of a specific plastic material may advantageously be used to provide different caps with the same design for the same screw, but with a different torque limit.

In a practical embodiment of the pipe clip the recess in the screw head may be a socket, preferably a hexagonal socket (hex socket). The socket, and in particular the hex socket can receive a mating tool tip, which is common tool tip shape. Thus when the pipe clip for some reason has to be released, the torque limiting cap can be removed and the socket in the screw head can be used to unscrew the tightening screw.

In a practical embodiment of the pipe clip the recess in the cap has a cruciform shape. This has the advantage that the pipe clip can be tightened with the most common cruciform screw driver heads.

In a possible embodiment the torque limiting cap comprises a dome that receives the screw head. The dome covers the screw head and prevents that the screw head is directly engaged with a tool or otherwise, whereby the torque limiting function might be circumvented.

In a further embodiment the cap comprises an extension part on top of the dome, wherein the recess, which is able to mate with the screw driver, is arranged in said extension part.

The peripheral surface of the extension part may have a cylindrical shape or a hexagonal shape. In particular the hexagonal outer shape of the extension part provides the option to tighten the combination screw/torque limiting cap by means of a spanner, wrench or other suitable tool. Obviously in that case the recess in the extension part is not used and will not be destroyed when a certain torque limit is exceeded. Advantageously the cap is designed such that the protrusion located on the inner side of the cap and mating with the socket in the screw head is destroyed when a certain torque limit is exceeded. The torque limit determined by the recess in the extension part and the torque limit determined by the protrusion on the inner side of the cap may be different, in particular the latter will be higher than the former. To provide this a hexagonal shape of the protrusion and the socket is advantageous.

In another preferred embodiment of the pipe clip according to the invention the torque limiting cap is retained on the screw head in the axial direction of the screw and is coupled in a direction of rotation to the screw head by a ratchet mechanism which allows rotation of the cap relative to the screw head in a tightening direction if the torque applied to the cap exceeds a predetermined threshold value and blocks rotation relative to the screw head in an opposite direction.

In this embodiment the torque transferring feature comprises the ratchet mechanism.

Preferably this torque limiting cap is made of metal, preferably spring steel. Advantageously in this embodiment of the pipe clip the torque limiting cap is not destroyed when the torque limit is exceeded. The tightening screw with the torque limiting cap can be used and re-used if for some reason the screw has been released and has to be tightened again.

In a more specific embodiment the screw head has a peripheral surface, a shaft-sided surface and a top surface opposite the shaft sided surface, wherein the torque limiting cap comprises a top plate that is located at the side of the top surface of the screw head and is provided with a cut-out or recess which is able to mate with a screw driver, and retaining arms that run from the top plate along the peripheral surface of the screw head towards the shaft sided surface, said retaining arms having a hook end that grips behind the edge between the peripheral surface and the shaft sided surface of the screw head, and wherein ramp shaped lugs are formed on the peripheral surface of the head, wherein the ramp shaped lugs and the retaining arms form part of said ratchet mechanism wherein the retaining arms are able to run onto and beyond the ramp shaped lugs in a tightening direction when a predetermined torque is applied to the torque limiting cap and wherein the retaining arms are blocked by the ramp shaped lugs in an untightening direction.

In a further practical embodiment the screw head is a polygonal head, preferably a hexagonal head, and the ramp shaped lugs are located adjacent the axially extending edges of the polygonal head.

In a possible further embodiment the screw head has a blind central hole in a top surface, wherein the cut-out or recess in the top plate of the torque limiting cap is aligned with said blind central hole in the screw head.

In yet another preferred embodiment of the pipe clip according to the invention the torque limiting cap is retained on the screw head in the axial direction of the screw and in the direction of rotation, wherein the torque limiting cap has a base plate that is arranged on a top side of the screw head, and wings extending from the peripheral edge and are folded over such that they have end portions that extend substantially parallel to the base plate, wherein the peripheral edges of the end portions of the folded wings are spaced apart in such a way that essentially crosswise slots are formed adapted to mate with a screw driver, and wherein the folded wings are adapted and arranged to be elastically deformed by the screw driver when the torque applied by the screw driver to the cap exceeds a predetermined value, such that the screw driver shifts out of the slot(s), so as to limit the torque to be applied to the screw.

This torque limiting cap is preferably formed from sheet metal, in particular from a spring steel sheet.

Advantageously in this embodiment of the pipe clip the torque limiting cap is not destroyed when the torque limit is exceeded. The tightening screw with the torque limiting cap can be used and re-used if for some reason the screw has been released and has to be tightened again.

In a practical embodiment the torque transferring feature comprises a weld or screw connection fixing the torque limiting cap to the screw head.

In a possible further embodiment the cap has retaining arms that extend from the base plate to an opposite side as the folded wings extend to, which arms extend along the peripheral surface of the screw head, said arms being connected to the screw head, e.g. by welding or screwing. In particular the screw head may be cylindrical and provided with a male thread and the arms may be formed as cylinder sections which on their inner side are provided with a female thread able to cooperate with said male thread.

The invention will be described in more detail in the following description with reference to the drawings.

DETAILED DESCRIPTION OF THE INVENTION

Figure 1:
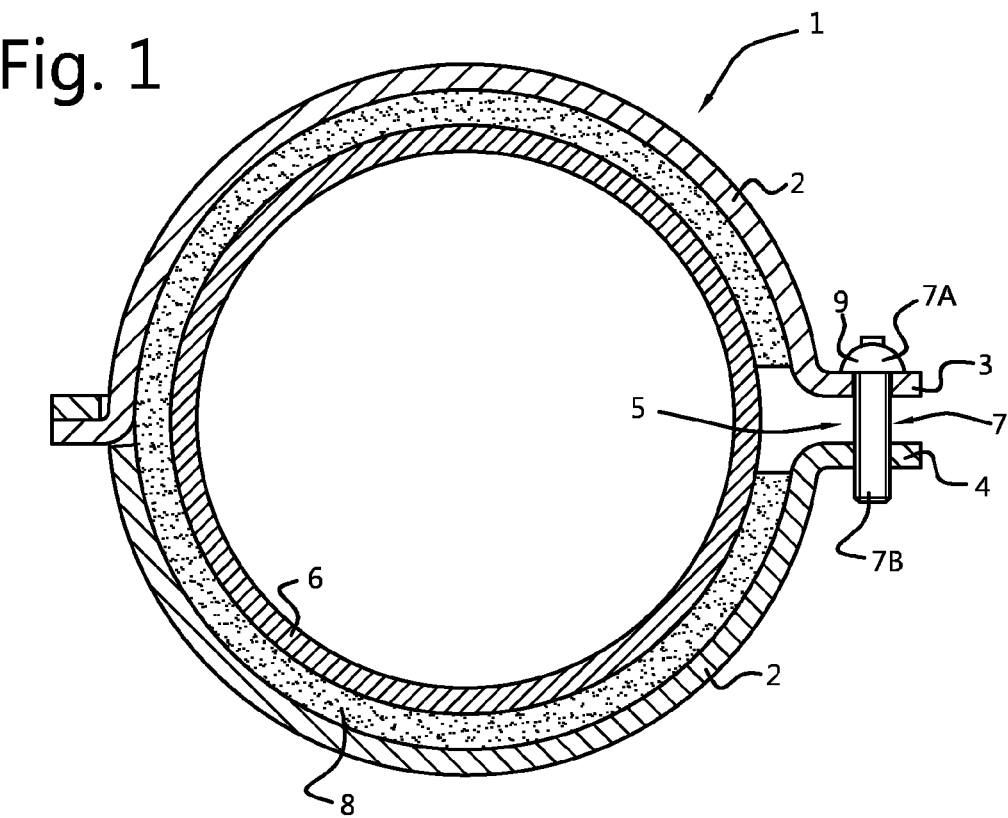
FIG. 1 shows a cross sectional view of a pipe clip according to the invention.

FIG. 1 shows a pipe clip 1 comprising a metal annular clip body 2. The pipe clip 1 has a vibration insulating lining 8 provided on the inner side of the annular clip body 2.

In the particular example of FIG. 1 the clip body 2 has on one side two opposing radial flanges 3, 4 defining an opening 5 adapted to arrange the pipe clip body 2 around a pipe 6. It is possible that the clip body has opposing flanges on both sides which can be tightened together, but this is not essential to the invention.

The pipe clip body 2 has at the radial flange 4 a female fastening means, in this case formed as a threaded hole in the flange 4. The pipe clip 1 comprises a tightening screw 7 having a screw head 7A and a screw shank 7B. The screw shank 7B is provided with a male thread adapted to cooperate with the female thread of the hole in the flange 4. The screw head 7A engages the other radial flange 3 so as to tighten the flanges 3, 4 towards each other and tighten the pipe clip 1 around the pipe 6.

A torque limiting cap 9 is arranged on the screw head 7A of the tightening screw 7. In the following different tightening screws are described which will be indicated by reference numerals 17, 27 and 37 respectively and the corresponding caps are indicated by reference numerals 19, 29, 39 respectively.

In FIGS. 2-5 is illustrated an embodiment of a tightening screw 17 with a torque limiting cap 19 made of plastic.

The torque limiting cap 19 comprises a dome 191 that is positioned over the screw head 17A. The screw head 17A has a recess formed as a socket, in particular a hex socket 171. On an inner side of the cap, i.e. the concave side of the dome 191 a torque transferring protrusion 192 is formed (cf. FIG. 5) those mates with a socket 171 in the screw head 17A. The protrusion 192 has a hexagonal shape. The protrusion 192 mating with the socket 171 forms a torque transferring feature that couples the cap 19 to the screw head 17A in a rotational direction of the screw.

Figure 2:
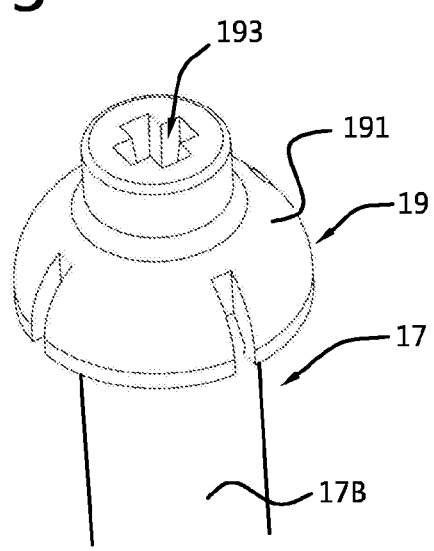
FIG. 2 shows a view in perspective of a possible embodiment of tightening screw with a torque limiting cap for a pipe clip according to the invention.
Figure 3:
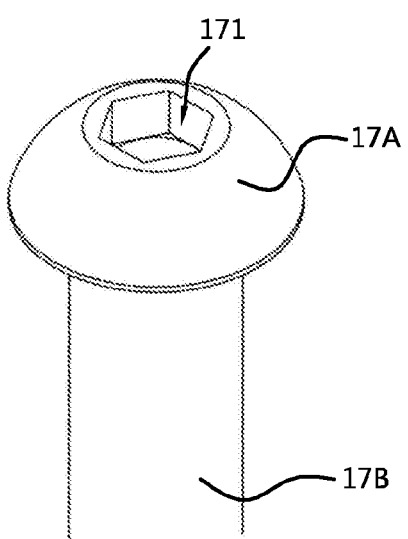
FIG. 3 shows a view in perspective of the tightening screw of FIG. 2 without the torque limiting cap.
Figure 4:
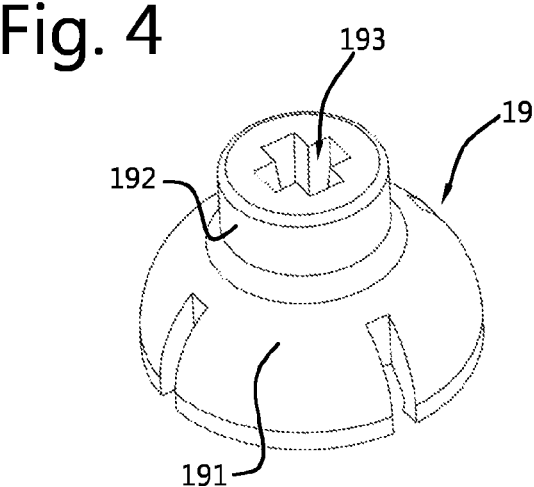
FIG. 4 shows a view in perspective of the torque limiting cap of the tightening screw of FIG. 2.
Figure 5:
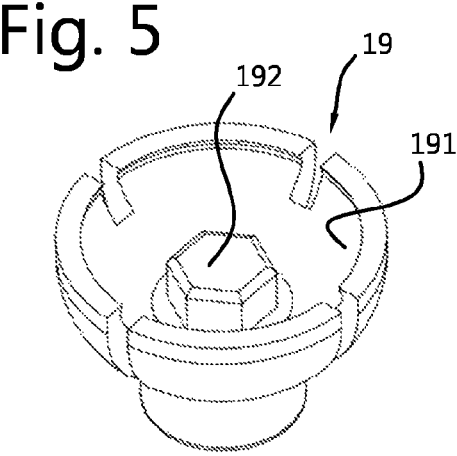
FIG. 5 shows another view in perspective of the torque limiting cap of FIG. 4

The cap 19 comprises on an outer side, i.e. the convex side of the dome 191 an extension part 192 on top of the dome 191. A recess 193 which is able to mate with a screw driver is formed in the extension part 192. In the example shown the recess has a cruciform shape as can be seen in FIGS. 2 and 4. The peripheral surface of the extension part 192 has a cylindrical shape as can be seen in FIGS. 2 and 4.

The plastic cap 19 is formed such that it is destructed at the recess 193 by the screw driver when the torque applied by a screw driver to the cap 19 exceeds a predetermined value so as to limit the torque to be applied to the screw 17.

Figure 6:
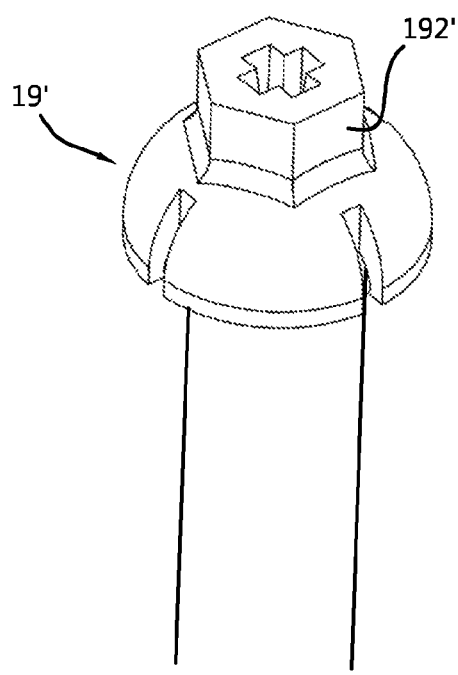
FIG. 6 shows a view in perspective of an alternative embodiment of the tightening screw of FIG. 2.
Figure 7:
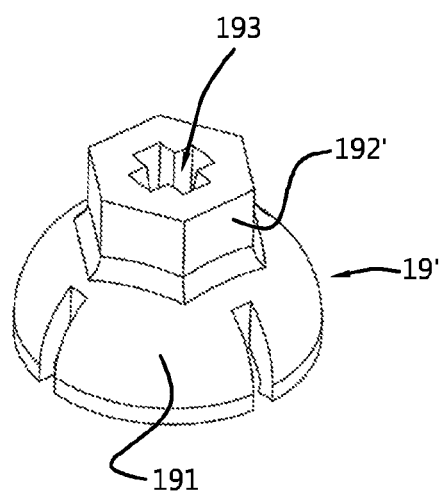
FIG. 7 shows a view in perspective of the torque limiting cap of the tightening screw of FIG. 6.

In FIGS. 6 and 7 a similar screw 17 is shown provided with an alternative cap 19'. The only difference with the previous cap 19 is the outer contour of the extension part 192' which is polygonal, in this particular example hexagonal. The other features are the same as the cap 19 shown in FIGS. 2-5 and are indicated with the same reference numerals.

In particular the hexagonal outer shape of the extension part 192' provides the option to tighten the combination of the screw 17 and the torque limiting cap 19' by means of a spanner, wrench or other suitable tool. Obviously in that case the recess in the extension part is not used and will not be destroyed when a certain torque limit is exceeded. Advantageously the cap 19' is designed such that the protrusion 192 located on the inner side of the cap 19' and mating with the socket 171 in the screw head 17A is destroyed when a certain torque limit is exceeded. The torque limit determined by the recess 193 in the extension part 192' will be lower than the torque limit determined by the protrusion 192 on the inner side of the cap.

Figure 8:
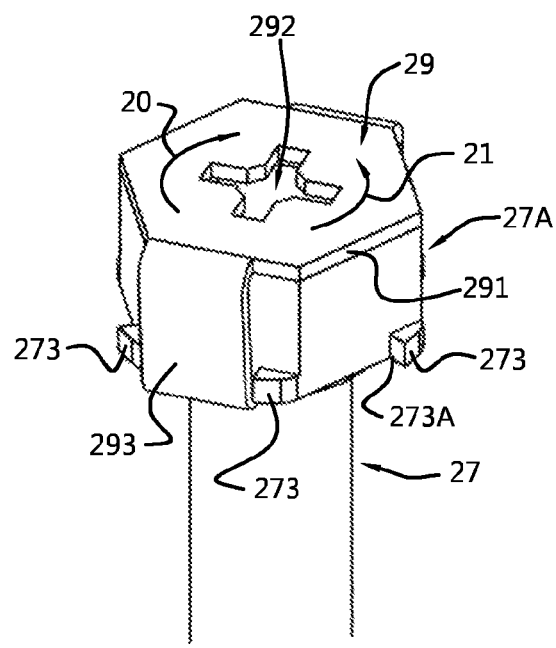
FIG. 8 shows a view in perspective of another possible embodiment of tightening screw with a torque limiting cap for a pipe clip according to the invention.
Figure 9:
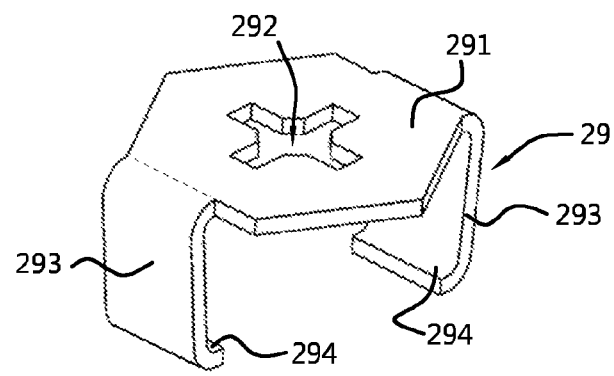
FIG. 9 shows a view in perspective of the torque limiting cap of the tightening screw of FIG. 8.
Figure 10:
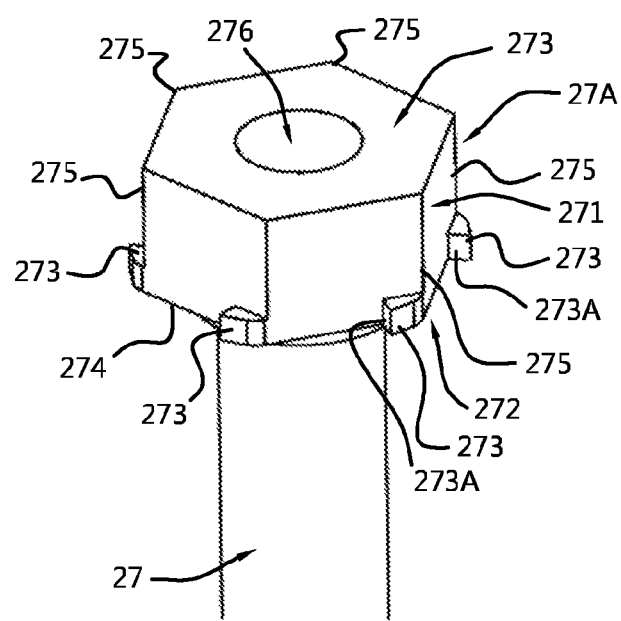
FIG. 10 shows a view in perspective of the tightening screw of FIG. 8 without the torque limiting cap.

In FIGS. 8-10 is shown a different embodiment of a tightening screw 27 with torque limiting cap 29.

In this particular embodiment the torque limiting cap 29 is retained on the screw head 27A in the axial direction of the screw 27 and is coupled in a direction of rotation to the screw head 27A by a ratchet mechanism which allows rotation of the cap 29 relative to the screw head 27A in a tightening direction 20 if the torque applied to the cap exceeds a predetermined threshold value and blocks rotation relative to the screw head 27A in an opposite direction 21.

The torque limiting cap 29 in this embodiment is made of metal, preferably spring steel.

The screw head 27A has a peripheral surface 271, a shaft sided surface 272 and a top surface 273 opposite the shaft sided surface 272. The torque limiting cap 29 comprises a top plate 291 that is located at the side of the top surface 273 of the screw head 27 and is provided with a cut-out 292 which is able to mate with a screw driver. The cut-out has a cruciform shape in this example. The cap 29 has retaining arms 293 that run from the top plate 291 along the peripheral surface 271 of the screw head 27A towards the shaft sided surface 272. In this example the cap has two radially opposing retaining arms, but the cap could have more retaining arms. The retaining arms 293 each have a hook end 294 that grips behind the edge 274 between the peripheral surface 271 and the shaft sided surface 272 of the screw head 27A.

Ramp shaped lugs 273 are formed on the peripheral surface of the screw head 27A. The ramp shaped lugs 273 and the retaining arms 293 form part of the mentioned ratchet mechanism wherein the retaining arms 293 are able to run onto and beyond the ramp shaped lugs 273 in a tightening direction (indicated by arrow 20 in FIG. 8) when a predetermined torque is applied to the torque limiting cap 29. The retaining arms 293 are blocked by a stop surface 273A of the ramp shaped lugs 273 in an untightening direction (indicated by arrow 21 in FIG. 8).

The screw head 27A is a polygonal head, in this particular example a hexagonal head. The ramp shaped lugs 273 are located adjacent axially extending edges 275 of the polygonal head 27A.

The screw head 27A has a blind central hole 276 in the top surface 273. The cut-out 292 in the top plate 291 of the torque limiting cap 29 is aligned with said blind central hole 276 in the screw head 27A. This allows that a screw driver tip can be inserted far enough in the cut-out such that the engagement is not the limiting factor on what torque can be applied to the cap 29 and the head 27A.

Figure 11:
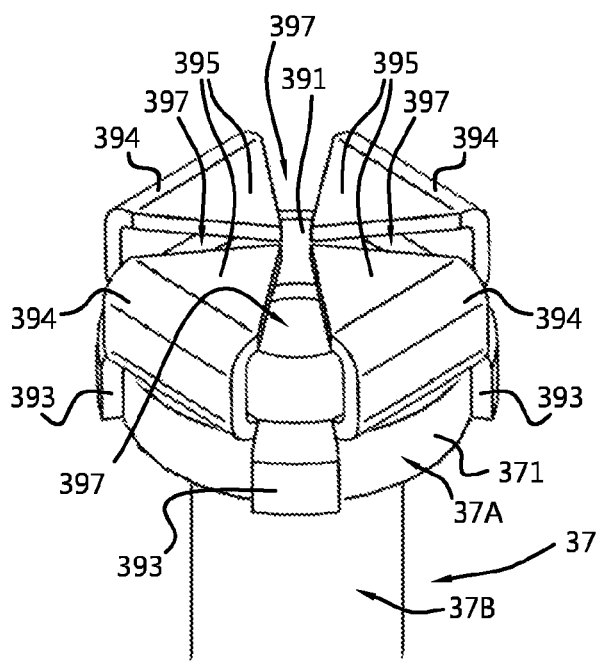
FIG. 11 shows a view in perspective of yet another possible embodiment of tightening screw with a torque limiting cap for a pipe clip according to the invention.
Figure 12:
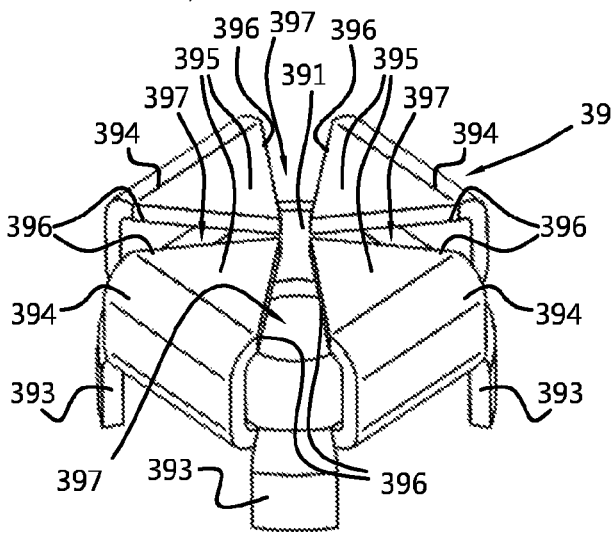
FIG. 12 shows a view in perspective of the torque limiting cap of the tightening screw of FIG. 11.
Figure 13:
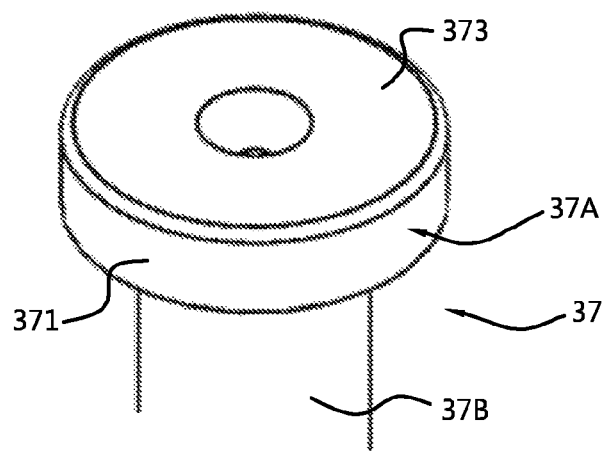
FIG. 13 shows a view in perspective of the tightening screw of FIG. 11 without the torque limiting cap.

In FIGS. 11-13 is shown yet another different embodiment of a tightening screw 37 with torque limiting cap 39. The screw 37 has a head 37A and a shaft 37B.

Preferably the torque limiting cap 39 is formed from sheet metal, in particular from a spring steel sheet.

The torque limiting cap 39 in this embodiment is retained on the screw head 37A in the axial direction of the screw 37 and in the direction of rotation. The torque limiting cap 39 has a base plate 391 that is arranged on a top side 373 of the screw head 37. The cap 39 has wings 394 extending from the peripheral edge of the base plate 391 and are folded over such that they have end portions 395 that extend substantially parallel to the base plate 391. The peripheral edges 396 of the end portions of the folded wings 394 are spaced apart in such a way that essentially crosswise slots 397 are formed adapted to mate with a screw driver. The folded wings 394 are adapted and arranged to be deformed by the screw driver when the torque applied by the screw driver to the cap 39 exceeds a predetermined value, such that the screw driver shifts out of the slot(s) 397, so as to limit the torque to be applied to the screw 37.

The cap 39 has arms 393 that extend from the base plate 391 to an opposite side as the folded wings 394 extend to. The arms 393 extend along a peripheral surface 371 of the screw head 37A. The arms 393 are connected to the screw head 37A. The arms 393 may for example be welded to the screw head 37A. Alternatively, the peripheral surface 371 of the screw head may be threaded, and the arms 393 may be provided with female thread sections able to cooperate with the male thread on the peripheral surface 371. Thereby the cap 39 can be screwed onto the screw head 37A.

The invention claimed is:

1. A pipe clip comprising a metal annular clip body having at least two opposing radial flanges defining an opening adapted to arrange the pipe clip body around a pipe,
    wherein the pipe clip body has at one of the radial flanges a female fastening means and wherein the pipe clip comprises a tightening screw having a screw head and a screw shank, said screw shank being provided with a male thread adapted to cooperate with the female fastening means,
    wherein the screw head engages the other of the radial flanges so as to tighten the flanges towards each other and tighten the pipe clip around the pipe,
    wherein the pipe clip has a vibration insulating lining provided on the inner side of the annular clip body, and
    wherein a torque limiting cap is arranged on the screw head of the tightening screw, said torque limiting cap including at least one torque transferring feature that couples the cap to the screw head in a rotational direction.

2. The pipe clip according to claim 1, wherein the torque limiting cap is made of plastic and has on an inner side a torque transferring protrusion that mates with a recess in the screw head such that a torque can be transferred from the cap to the screw head, and which plastic cap has on an outer side a recess which is able to mate with a screw driver, wherein the plastic cap is adapted and arranged to be destructed at the recess by the screw driver when the torque applied by a screw driver to the cap exceeds a predetermined value so as to limit the torque to be applied to the screw.

3. The pipe clip according to claim 2, wherein the recess in the screw head is a socket.

4. The pipe clip according to claim 3, wherein the socket is a hexagonal socket.

5. The pipe clip according to claim 2, wherein the recess in the cap has a cruciform shape.

6. The pipe clip according to claim 2, wherein the torque limiting cap comprises a dome that receives the screw head.

7. The pipe clip according to claim 6, wherein the cap comprises an extension part on top of the dome, wherein the recess, which is able to mate with the screw driver, is arranged in said extension part.

8. The pipe clip according to claim 6, wherein a peripheral surface of the extension part has a cylindrical shape.

9. The pipe clip according to claim 6, wherein a peripheral surface of the extension part has a hexagonal shape.

10. The pipe clip according to claim 1, wherein the torque limiting cap is retained on the screw head in the axial direction of the screw and is coupled in a direction of rotation to the screw head by a ratchet mechanism which allows rotation of the cap relative to the screw head in a tightening direction if the torque applied to the cap exceeds a predetermined threshold value and blocks rotation relative to the screw head in an opposite direction.

11. The pipe clip according to claim 10, wherein the torque limiting cap is made of metal.

12. The pipe clip according to claim 11, wherein the torque limiting cap is made of spring steel.

13. The pipe clip according to claim 10, wherein the screw head has a peripheral surface, a shaft sided surface and a top surface opposite the shaft sided surface, and wherein the torque limiting cap comprises a top plate that is located at a side of the top surface of the screw head and is provided with a cut-out or recess which is able to mate with a screw driver, and retaining arms that run from the top plate along the peripheral surface of the screw head towards the shaft sided surface, said retaining arms having a hook end that grips behind an edge between the peripheral surface and the shaft sided surface of the screw head, and wherein ramp shaped lugs are formed on the peripheral surface of the head, wherein the ramp shaped lugs and the retaining arms form part of said ratchet mechanism wherein the retaining arms are able to run onto and beyond the ramp shaped lugs in a tightening direction when a predetermined torque is applied to the torque limiting cap and wherein the retaining arms are blocked by the ramp shaped lugs in an untightening direction.

14. The pipe clip according to claim 13, wherein the screw head is a polygonal head, and wherein the ramp shaped lugs are located adjacent axially extending edges of the polygonal head.

15. The pipe clip according to claim 13, wherein the screw head has a blind central hole in a top surface, wherein the cut-out or recess in the top plate of the torque limiting cap is aligned with said blind central hole in the screw head.

16. The pipe clip according to claim 1, wherein the torque limiting cap is retained on the screw head in the axial direction of the screw and in the direction of rotation, wherein the torque limiting cap has a base plate that is arranged on a top side of the screw head, and wings extending from a peripheral edge of the base plate and are folded over such that they have end portions that extend substantially parallel to the base plate, wherein the peripheral edges of the end portions of the folded wings are spaced apart in such a way that essentially crosswise slots are formed and adapted to mate with a screw driver, and wherein the folded wings are adapted and arranged to be deformed by the screw driver when torque applied by the screw driver to the cap exceeds a predetermined value, such that the screw driver shifts out of the slots, so as to limit the torque to be applied to the screw.

17. The pipe clip according to claim 16, wherein the torque limiting cap is fixed to the screw head by welding or a screw connection.

18. The pipe clip according to claim 16, wherein the cap has retaining arms that extend from the base plate to an opposite side as the folded wings extend to, which arms extend along the peripheral surface of the screw head, said arms being connected to the screw head.

19. The pipe clip according to claim 16, wherein the torque limiting cap is formed from a spring steel sheet.

* * * * *